United States Patent
Vu

(10) Patent No.: US 7,933,623 B1
(45) Date of Patent: Apr. 26, 2011

(54) SYSTEM AND METHOD FOR ADDRESSING DISPATCH STATIONS

(75) Inventor: Trinh D. Vu, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 1185 days.

(21) Appl. No.: 11/373,149

(22) Filed: Mar. 13, 2006

Related U.S. Application Data

(60) Provisional application No. 60/660,546, filed on Mar. 11, 2005.

(51) Int. Cl.
- H04B 7/00 (2006.01)
- H04M 3/42 (2006.01)
- H04M 1/00 (2006.01)
- H04L 12/28 (2006.01)
- H04L 12/56 (2006.01)
- H04J 3/24 (2006.01)
- G06F 15/16 (2006.01)
- G06F 15/173 (2006.01)

(52) U.S. Cl. ........ 455/519; 455/515; 455/517; 455/518; 455/414.1; 455/560; 370/401; 370/474; 709/227; 709/238

(58) Field of Classification Search ............... 455/414.1, 455/517, 518, 519, 560; 370/401, 474; 709/227, 709/238

See application file for complete search history.

(56) References Cited

U.S. PATENT DOCUMENTS

| | | | |
|---|---|---|---|
| 5,533,096 A * | 7/1996 | Bales | 455/560 |
| 5,670,950 A * | 9/1997 | Otsuka | 455/411 |
| 7,366,515 B2 * | 4/2008 | Zhao et al. | 455/445 |
| 2002/0055854 A1 * | 5/2002 | Kurauchi et al. | 705/1 |
| 2002/0165969 A1 * | 11/2002 | Gallant | 709/227 |
| 2003/0153339 A1 * | 8/2003 | Crockett et al. | 455/518 |
| 2003/0153341 A1 * | 8/2003 | Crockett et al. | 455/519 |
| 2003/0203741 A1 * | 10/2003 | Matsuo et al. | 455/519 |
| 2004/0153676 A1 * | 8/2004 | Krantz et al. | 713/300 |
| 2004/0264503 A1 * | 12/2004 | Draves, Jr. | 370/469 |
| 2005/0135386 A1 * | 6/2005 | Shores et al. | 370/401 |
| 2006/0052130 A1 * | 3/2006 | Choksi | 455/552.1 |
| 2006/0072517 A1 * | 4/2006 | Barrow et al. | 370/335 |
| 2006/0225108 A1 * | 10/2006 | Tabassi et al. | 725/100 |
| 2007/0280249 A1 * | 12/2007 | Draves | 370/392 |
| 2008/0096600 A1 * | 4/2008 | Siegel | 455/519 |
| 2008/0125123 A1 * | 5/2008 | Dorenbosch et al. | 455/436 |
| 2009/0131091 A1 * | 5/2009 | Yang et al. | 455/518 |
| 2009/0172138 A1 * | 7/2009 | Wang et al. | 709/223 |
| 2009/0232128 A1 * | 9/2009 | Paulis et al. | 370/352 |

* cited by examiner

Primary Examiner — Matthew D. Anderson
Assistant Examiner — Bobbak Safaipour

(57) ABSTRACT

A system and method for dispatch communications are provided. A dispatch station can use one or more alias addresses for communicating with other dispatch stations. The dispatch station can register with a dispatch network for only one of the alias addresses or a number of the alias addresses.

13 Claims, 2 Drawing Sheets

SYSTEM AND METHOD FOR ADDRESSING DISPATCH STATIONS

Figure 1:
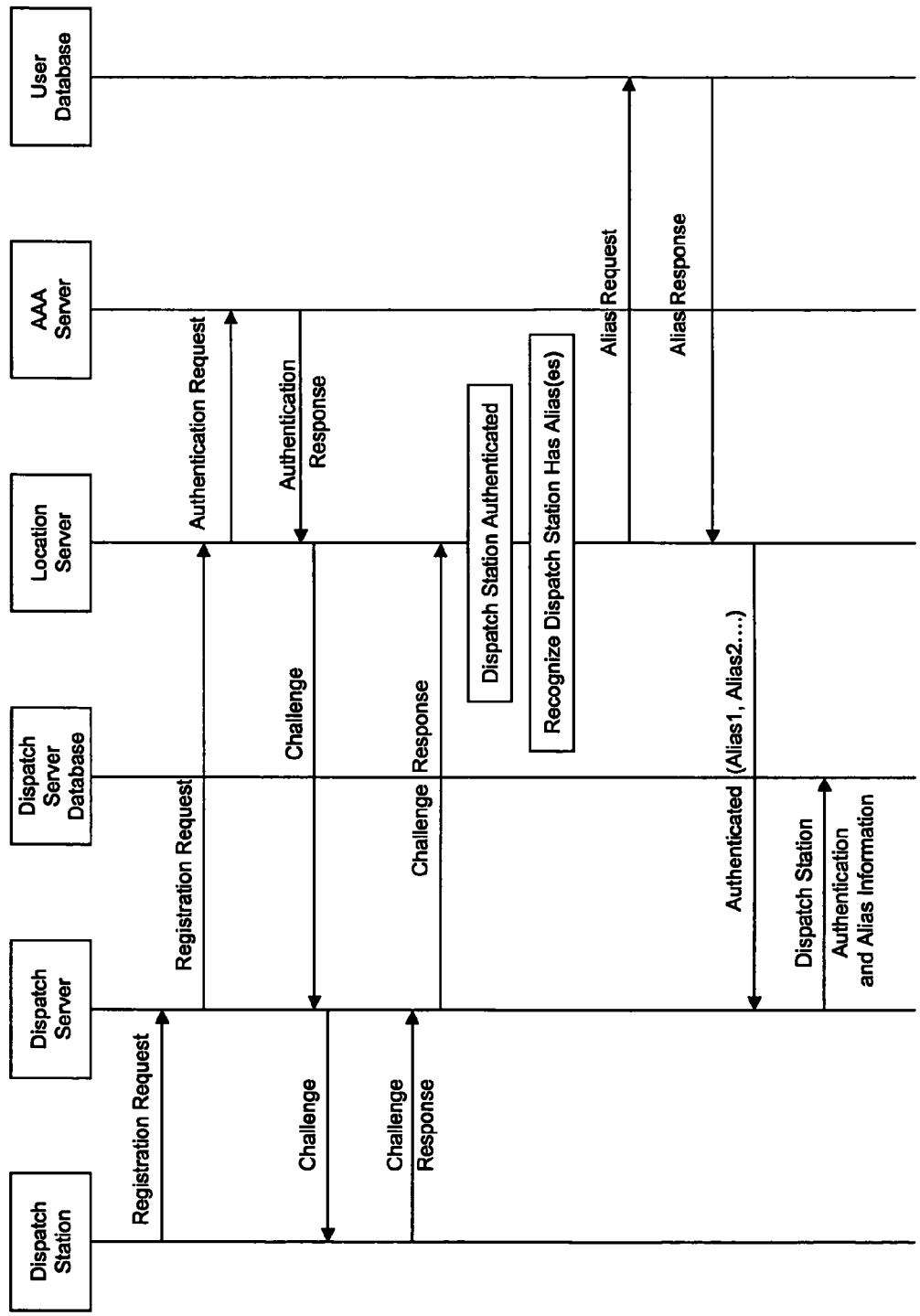

The present application claims priority under 35 U.S.C. §119 to U.S. Provisional Application No. 60/660,546, filed Mar. 11, 2005, the entire disclosure of which is herein expressly incorporated by reference.

BACKGROUND OF THE INVENTION

Some wireless communication networks, such as the iDEN network owned and operated by Nextel Communications, Inc., can provide two different types of voice communications services, interconnect and dispatch. An interconnect communication is what is conventionally considered "cellular communications", while a dispatch communication is commonly known as a walkie-talkie or push-to-talk (PTT) type of call such as Nextel's service identified by the trade name Direct Connect.

In conventional wireless communication networks a communication station is assigned a single station identifier. This communication station identifier is used by other communication stations to initiate a call to the communication station. However, the use of a single communication station identifier can be limiting.

SUMMARY OF THE INVENTION

In accordance with exemplary embodiments of the present invention, a dispatch station, such as a communication station running a QChat client, can be associated with one or more communication addresses, such as session initiation protocol (SIP) addresses. Accordingly, a dispatch network can allow dispatch calls to or from the dispatch station based on either address.

Exemplary embodiments of the present invention allow a dispatch station user to distinguish between incoming business and personal calls. In addition, the user could define a private address, such as a SIP address to be used only by certain group of users for privacy purpose, convenience or both. For example, a dispatch station can have both 7034331234@network.com and Jdoe@network.com as SIP addresses. The SIP address of 7034331234@network.com can be used for business contacts and Jdoe@network.com for private contacts.

Other objects, advantages and novel features of the present invention will become apparent from the following detailed description of the invention.

BRIEF DESCRIPTION OF THE DRAWING FIGURES

Figure 2:
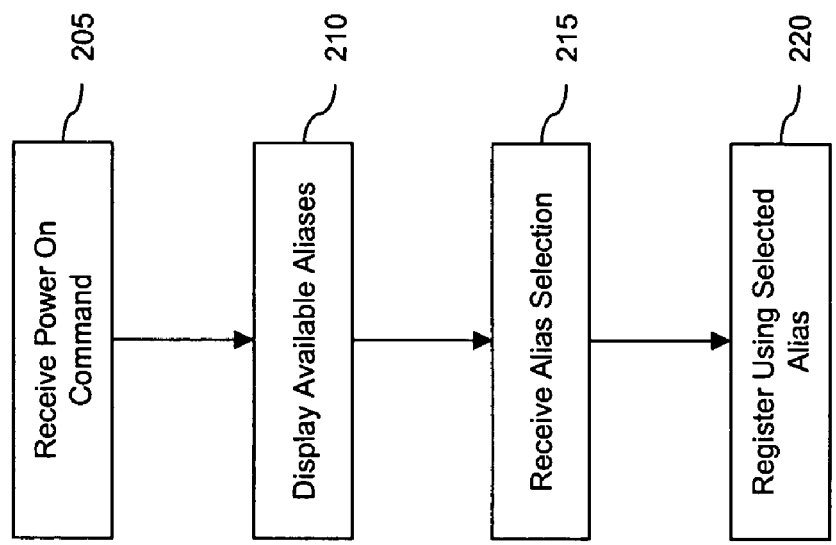

FIG. 1 is a signaling diagram of an exemplary method in accordance with the present invention; and FIG. 2 is a flow diagram of an exemplary method in accordance with the present invention.

DETAILED DESCRIPTION OF THE PREFERRED EMBODIMENTS

FIG. 1 is a signaling diagram of an exemplary method in accordance with the present invention. When a dispatch station sends a registration request to a dispatch server, the dispatch server forwards the registration request to a location server. The registration request includes an address or alias for the dispatch station. This address can be, for example, a session initiation protocol (SIP) address, such as 7034331234@network.com. The location server requests credentials for the dispatch station from a authentication, authorization and accounting (AAA) server, which responds with the credentials. Using the provided credentials, the location server sends a challenge to the dispatch server, which forwards the challenge to the dispatch station. The dispatch station forms a challenge response and transmits the response to the dispatch server. The dispatch server forwards the response to the location server which determines whether the challenge response is correct. When the challenge response is correct, the dispatch station has been authenticated.

The location server then determines whether the dispatch station has one or more aliases. The indication of whether a dispatch station has aliases can be provided by a flag in the dispatch stations record in the location server. When the location server determines that a dispatch station has aliases, the location server sends an alias request message to a user database. The user database provides an alias response, including all of the aliases associated with the dispatch station. The location server then sends a message to the dispatch server indicating that the dispatch station has been authenticated and identifying the aliases associated with the dispatch station. The dispatch server sends the authentication and alias information to a local database, such as a visitor location register. Accordingly, when the dispatch server receives a call setup request for one of the aliases of the dispatch station, the dispatch server can recognize that the alias is associated with the dispatch station and setup a call with the dispatch station.

Although the method described above in connection with FIG. 1 stores the aliases in a user database, the aliases can be stored in the location server when the dispatch station is provisioned. Moreover, although the method has been described with the dispatch station transmitting a single address or alias with the registration request, the dispatch station can transmit more than one address or alias in one or more registration requests.

The method of FIG. 1 can be used to support dispatch calls between dispatch stations supported by dispatch networks operating according to different protocols. Qualcomm Incorporated provides a dispatch communication service known as QChat. The QChat system only supports one SIP address per dispatch station. As a result, it is not possible to allow a QChat user to be reached via different SIP addresses. In addition, the incompatible addressing conventions of the QChat and iDEN system do not allow a QChat user to be contacted by an iDEN user without the use of some type of Universal Fleet Mobile Identity ("UFMI") alias, which is an addressing convention specific to the iDEN system. There is no SIP addressing used in the iDEN dispatch system today, and iDEN system does not support multiple UFMI per device.

Accordingly, the method of FIG. 1 allows an iDEN user to call a QChat user with a UFMI alias without any name translation required at the QChat gateway. The incoming call will have an UFMI alias such as 703*433*1234@network.com and the QChat gateway can strip out the "*" to derive the SIP address of the QChat user and forward the call to the QChat server.

FIG. 2 is a flow diagram of an exemplary method in accordance with the present invention. The method of FIG. 2 allows a user of a dispatch station to select one of a number of different aliases for which the dispatch station will be registered with the network. Unlike the method of FIG. 1, in the method of FIG. 2 only calls to the selected alias will be forwarded to the dispatch station. Calls to non-selected aliases will be rejected, or an indication that the dispatch station is not available or unreachable can be provided. Accordingly, when a dispatch station receives a power-on command (step 205), the dispatch station displays a number of different aliases available for the dispatch station (step 210). When the dispatch station receives an alias selection from the user (step 215), the dispatch station will register with the network using the selected alias (step 220).

Although not illustrated, the dispatch station, after the initial registration but before a call is setup, can switch to a particular alias (e.g., a SIP address) for the dispatch station. In this case, the provisioned aliases could be downloaded into the dispatch station via, for example, an application configuration access protocol/XML configuration access protocol (ACAP/XCAP) server over the air during activation of the dispatch station.

Although exemplary embodiments of the present invention have been described in connection with QChat, the systems, methods and techniques described herein can also be employed in other types of dispatch communication systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for dispatch communications, the method comprising the acts of:
   receiving a dispatch registration request from a dispatch station in a first network, wherein the registration request includes a dispatch station identifier in a format of the first network;
   registering and authenticating the dispatch station;
   obtaining at least one alias address of the registered and authenticated dispatch station in a format of a second network associated with the dispatch station whereby communication can be established with the dispatch station from the first network using the dispatch station identifier and from the second network using the at least one alias address;
   storing the at least one alias address in a dispatch server database logically coupled to the first network and the second network,
   wherein the first and second networks use incompatible addressing conventions;
   storing the at least one alias address in a user registration database;
   forwarding authentication information for a first address of the at least one alias address from the user registration database to the dispatch server database when the dispatch station is registered;
   receiving an incoming call to a second address of the at least one alias address; and
   routing the incoming call to the user.

2. The method of claim 1, further comprising the acts of:
   receiving, by a dispatch server, a dispatch communication request for the dispatch station, wherein the dispatch communication request includes the at least one alias address;
   obtaining the dispatch station identifier from the dispatch server database; and
   establishing a dispatch communication with the dispatch station.

3. The method of claim 1, wherein the dispatch station identifier and the at least on alias address are formatted according to a session initiation protocol (SIP) address format.

4. The method of claim 3, wherein the dispatch station identifier or the at least one alias address includes a universal fleet mobile station identifier (UFMI).

5. The method of claim 1, further comprising the acts of:
   receiving a request to change the dispatch station identifier; and
   transmitting a new dispatch station identifier to the dispatch station.

6. The method of claim 5, further comprising the act of:
   receiving a call setup request from the dispatch station, wherein the call setup request includes the new dispatch station identifier.

7. The method of claim 5, wherein the new dispatch station identifier is the least one alias address.

8. The method of claim 1, wherein the at least one alias address includes a plurality of alias addresses.

9. The method of claim 1, wherein the two or more alias addresses are stored in the user registration database when the dispatch station is provisioned in a dispatch network.

10. The method of claim 1, further comprising the act of associating the two or more alias addresses with a single Internet Protocol (IP) address identifying the dispatch station.

11. The method of claim 10, wherein the forwarded authentication information comprises data that the two or more alias addresses are associated with the single IP address.

12. The method of claim 1, further comprising the act of setting an address status flag in the user registration database, wherein the flag indicates that the dispatch station is associated with the two or more alias addresses.

13. The method of claim 1, wherein a user of the dispatch station determines for which of the at least one of the two or more alias addresses authentication information is forwarded from the user registration database to the dispatch server database.

* * * * *